United States Patent
Greenwood et al.

(10) Patent No.: US 8,289,366 B2
(45) Date of Patent: Oct. 16, 2012

(54) CONFERENCE ANNOTATION SYSTEM

(75) Inventors: Thomas Greenwood, Crosskeys (GB); Thomas Strickland, South Wales (GB)

(73) Assignee: Avaya Inc., Basking Ridge, NJ (US)

( * ) Notice: Subject to any disclaimer, the term of this patent is extended or adjusted under 35 U.S.C. 154(b) by 562 days.

(21) Appl. No.: 12/543,089

(22) Filed: Aug. 18, 2009

(65) Prior Publication Data

US 2011/0043597 A1    Feb. 24, 2011

(51) Int. Cl.
*H04N 7/14*    (2006.01)

(52) U.S. Cl. .................. 348/14.08; 348/14.01

(58) Field of Classification Search .............. 348/14.01, 348/14.02, 14.08–14.15; 370/259, 260; 709/204
See application file for complete search history.

(56) References Cited

U.S. PATENT DOCUMENTS

| | | | |
|---|---|---|---|
| 5,913,062 A * | 6/1999 | Vrvilo et al. | 719/321 |
| 5,920,694 A | 7/1999 | Carleton et al. | |
| 2005/0180341 A1 * | 8/2005 | Nelson et al. | 370/260 |
| 2009/0210779 A1 * | 8/2009 | Badoiu et al. | 715/230 |

OTHER PUBLICATIONS

Steeples, "Reflecting on group discussions for professional learning: annotating videoclips with voice annotations", Advanced Learning Technologies, 2000 IWALT 2000. Proceedings. ISPEC Accession No. 6806352.
Demoawy-Free Screen Recorder and Demo Creator, Internet product description found at http://www.mewsoft.com/Products/Demoawy.html, printed on Aug. 18, 2009, 3 pgs.

* cited by examiner

*Primary Examiner* — Tuan Nguyen
(74) *Attorney, Agent, or Firm* — Sheridan Ross P.C.

(57) ABSTRACT

Embodiments of the present invention are directed to a system and method for annotating a media stream from a live voice conversation, such as a conference call.

18 Claims, 5 Drawing Sheets

CONFERENCE ANNOTATION SYSTEM

CROSS REFERENCE TO RELATED APPLICATION

Cross reference is made to U.S. patent application Ser. No. 12/542,452, filed Aug. 17, 2009, entitled "Word Cloud Audio Navigation", which is incorporated herein by this reference in its entirety.

FIELD OF THE INVENTION

The present application relates generally to the field of telephone conference calls, and specifically to the field of annotations made by participants during conference calls.

BACKGROUND

In a conference call or telephone call, it may be useful to make annotations associated with the conference or phone call. In addition to making annotations, a conference may also be recorded. After the conference call, however, the annotations or notes that were taken contemporaneously with the conference may be difficult to understand out of context. This is especially true for longer conferences, or longer recordings. Additionally, in a longer conference or recording it may be difficult to find the point at which a particular note was made, making it more difficult to understand the annotation or note.

Recording conference calls that include audio and video is well known in the art. It is further known to associate metadata with recorded streams after the fact using products such as Adobe Flash™. Conference Call Notes™ is a service for recording notes for a conference. However, the service does not seem to have any way of recording the calls or associating the notes with the call. It is possible to record audio notes by a caller muting himself or herself and using a Dictaphone to record a note. The audio can be split into notes and attached to a recording of the conference after the fact.

It would be desirable to have a system and method of recording a call and attaching annotations to the recording as the call was being made. Each annotation would be associated with the time in the call at which it was made, and upon later review of the recording, the association of the annotation would be useful to direct the listener to the point in the conversation when the note was made. Upon playback of the recording, an indication can be made that a note is available, or a note can be highlighted when a note-point is reached. Other behavior could also be triggered during playback of the recording such as transition of a slide presentation. These needs are addressed in the present disclosure.

SUMMARY

These and other needs are addressed by the various embodiments and configurations of the present invention. The invention is directed generally to a system and method for annotating media streams, such as conference call recordings.

In a first embodiment, a method is provided that includes the steps of:

(a) recording, by a processor, a media stream, the media stream being part of a live voice call between at least first and second participants;

(b) during the recording step, receiving, by the processor and from the first participant, an annotation, the annotation being associated with a timestamp, the timestamp being indexed to a particular location in the recorded media stream; and (c) recording, by the processor, the annotation in association with the timestamp.

In a second embodiment, a device is provided having a processor operable to:

(a) record a media stream, the media stream being part of a live voice call between at least first and second participants;

(b) during the recording operation, receive, from the first participant, an annotation, the annotation being associated (e.g., linked or hyperlinked) with a timestamp, the timestamp being indexed to a particular location in the recorded media stream; and (c) record the annotation in association with the timestamp.

In the above embodiments, a call is recorded (as an audio and/or video stream) and, while recording the call, annotations are also recorded. A timestamp is recorded for each annotation. The timestamp is indexed with a corresponding location in the recorded call media stream. The annotation normally includes metadata. The metadata can be, for example, text, audio, or video. The metadata can be used, when later playing back the call.

There a number of ways that a user can enter an annotation during the live call. In one configuration, the user enters the annotation through a computer (such as through a web page). In another configuration, the user enters the annotation over the phone (such as by using the phone's keys).

In a third embodiment, a method is provided that includes the steps:

(a) providing, by a computer readable medium, an annotated media stream, the annotated media stream comprising media from a live voice call and a plurality of timestamps indexed to a plurality of locations in the media stream, wherein the plurality of timestamps comprise a selected timestamp and an annotation is associated with the selected timestamp; and (b) performing, by a computer, at least one of the following steps:

(B1) in response to receiving, by an input and from a first user, a selection of the annotation, providing, to the first user selectively, a portion of the media stream associated with the selected timestamp; and (B2) during playback to a first user of the annotated media stream, pausing automatically playback of the annotated media stream and providing to the first user, while playback is paused, a selected annotation.

When playing back the call recording and the timestamp for metadata is reached, an annotation's metadata can be flagged by the system. Flagging may be done, for example, by displaying the metadata (text) or by pausing playback of the main call recording and playing the audio annotation.

The annotation, in one configuration, is a bookmark; that is, a timestamp without metadata. The bookmark can signify an interesting point in the recorded media stream.

In another configuration, the annotation is more complex. For example, it can be used to trigger a software command, such as a slide transition in a presentation. As will be appreciated, other types of machine behavior may be triggered to be performed by the annotation.

In another configuration, the user is able to review the annotations along with the recording by accessing a list showing the time of each annotation and/or a bookmark to jump to that time in the main call recording. In the former case, the user may selectively review, such as by clicking on an icon associated with a selected annotation, the metadata of the selected annotation, or by clicking on an icon associated with a selected bookmark, the respective bookmarked portion of the media stream. The metadata review may be done in many ways, such as by showing the text of metadata or playing back the audio or video recording for the selected annotation.

In one configuration, the call recording is played back and the only annotations are those driving the slide transitions. If the user fast forwards into the recorded call media stream, the appropriate slides are still displayed at each timestamped point in the media stream. Alternatively the system can be set up so that, when the user changes slides, the call player seeks to the appropriate point in the call recording.

In one configuration, annotations are made by any participant in a call while the call is in progress. Current products allow any user to make annotations after, but not during, the call.

In one configuration, timestamps may be recorded by any viewer of a presentation while the presentation and/or call is in progress. Current products allow only the person driving the presentation to record timestamps indicating slide transitions (not any user in the call).

The present invention can provide a number of advantages depending on the particular configuration. By way of example, the invention can automatically associate an annotation, during call recording, with corresponding locations in the recorded call. This ability permits a user not only to take notes during a call but also review and understand the notes in context. Even in long call recordings, the points at which particular annotations are made can be accessed quickly and selectively and in the context in which they were made. The annotation can be used as a way of jumping directly into the recorded call media stream and immediately hearing or viewing the context in which the note was made. When playing back the recorded media stream and a note point is reached, the note may be highlighted.

These and other advantages will be apparent from the disclosure of the invention(s) contained herein.

The term "annotation" refers to any set of data structures for marking and/or annotating a corresponding location in a string of information, such as a media stream. In the latter case, the annotation normally includes metadata.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "bookmark" refers to a set of data structures that marks, saves, or otherwise indicates a location of interest.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The Summary is neither intended nor should it be construed as being representative of the full extent and scope of the present invention. The present invention is set forth in various levels of detail in the Summary as well as in the attached drawings and the Detailed Description and no limitation as to the scope of the present invention is intended by either the inclusion or non-inclusion of elements, components, etc. in this Summary. Additional aspects of the present invention will become more readily apparent from the Detailed Description, particularly when taken together with the drawings.

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION

The present disclosure is directed to a conference call annotation apparatus, system and methods of use. As used herein, annotation refers to any comment, note or act, made by a participant to a conference call or caused to be made by a participant to a conference call. An annotation may include, for example, a bookmark, a spoken note, a typed note, a slide transition, a messaging conversation, a written note and an electronic document.

While the present disclosure provides several embodiments of the present disclosure, individuals skilled in the art will understand that the embodiments described herein are not intended to limit the disclosure to only these embodiments. The present disclosure is intended to cover alternatives, modifications and equivalents that may be included within the spirit and scope of the disclosure as defined by the claims below.

Figure 1:
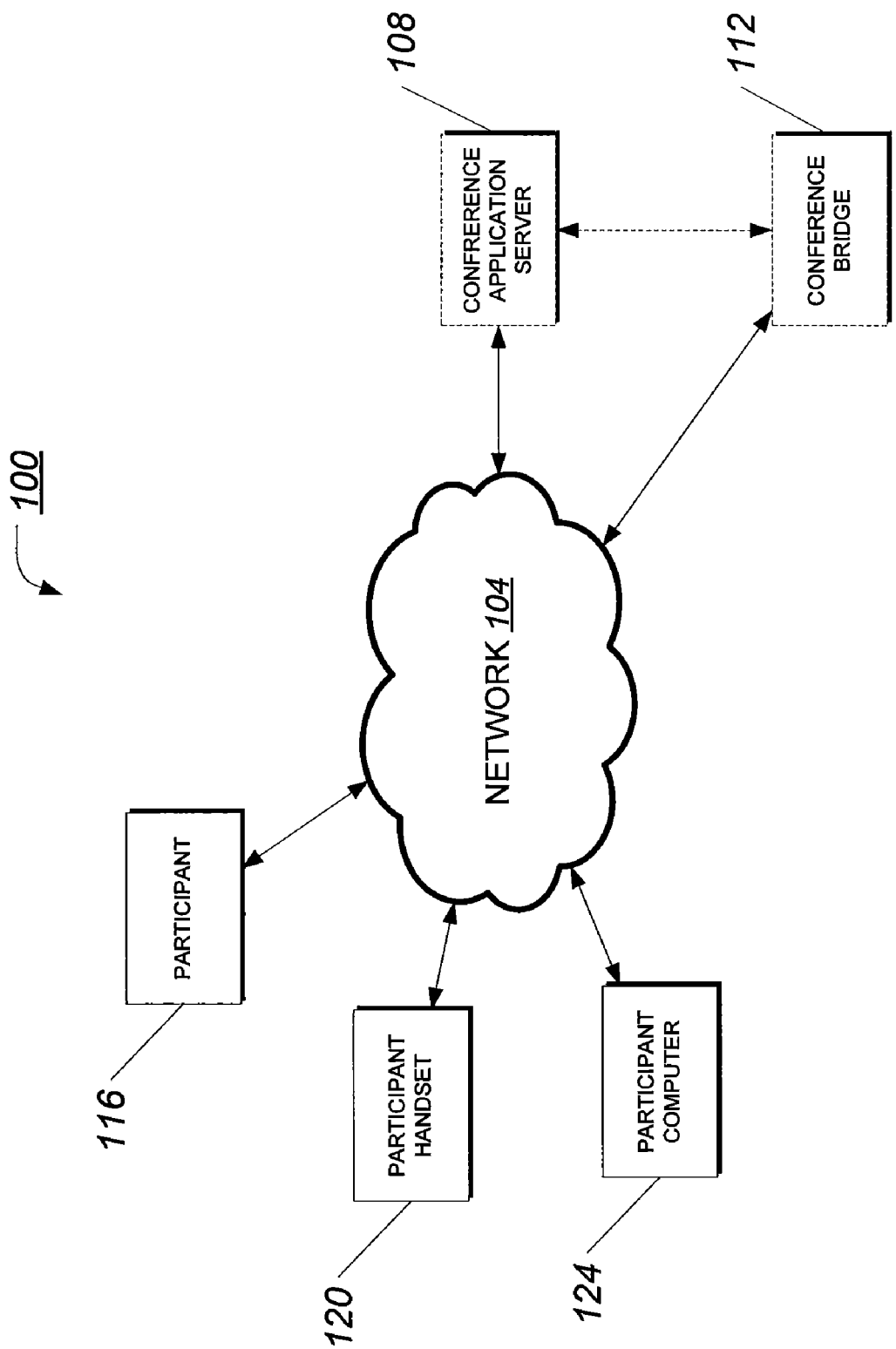
FIG. 1 shows components of a general system in one embodiment of the present disclosure.

With reference to FIG. 1, system 100 shows the components in a system in one embodiment of the present disclosure. System 100 includes a network 104, a conference application server 108, a conference bridge 112, a participant 116, a participant handset 120 and a participant computer 124. The network 104 is shown to be in communication with a conference application server 108, a conference bridge 112, a conference participant 116, a participant handset 120 and a participant computer 124. The network 104 may be a packet-switched network, a circuit-switched network or a combination thereof, that utilizes one or more protocols to interconnect the components connected to the network 104. The network 104 may be comprised of multiple components that are in communication with each other, and may include, for example, a hub, a router, an ATM gateway, a switch and a repeater. The network 104 may be, for example, a LAN, a WAN, the Internet and a wireless network. The network 104 may also comprise a public switched telephone network (PSTN), which is a communication network that interchanges data by circuit switching. As one having skill in the art will appreciate, a PSTN may comprise a plurality of central office switching systems, an interoffice signaling network and at least one service control point database coupled to the interoffice signaling network.

The conference application server 108 is a device that is operable to execute computing tasks, and may be specifically built and/or programmed to execute particular tasks. The conference application server 108 may also be a general-purpose computer that has been programmed or is able to be programmed to execute the operations and functions of the present disclosure. As one having skill in the art will appreciate, the conference application server 108 may include subcomponents including, for example, memory, a processor and a network communication interface. One having skill in the art will appreciate that a conference bridge 112 is a system or device that enables interconnection of a plurality of communication devices in a conference connection. A conference bridge 112 is well known in the art and may comprise a dedicated telephony conference device or a general-purpose computer. The following U.S. Patent Publications are generally directed to conference bridges, and are hereby incorporated by reference in their entireties: U.S. Pat. No. 4,611,095 to LeBlanc et al., U.S. Pat. No. 4,945,534 to Driscoll et al., U.S. Pat. No. 5,436,896 to Anderson et al. and U.S. Patent Publication 2003/0185369 to Oliver et al. Particularly preferred conference bridges are modified versions of IP Office™, Spectel 700™, System 70™, Quick Edition™, Partner™, Definity™, Communication Manager™, Magix™, Merlin Legend™ and Meeting Exchange™, all manufactured by Avaya, Inc. One having skill in the art will further appreciate that the conference application server 108 and the conference bridge 112 may be embodied in a single device. When embodied in a single device, certain resources may be shared including, for example, a processor, memory and a network communication interface.

A participant 116 is a participant in a conference call. The participant 116 may be, for example, a person, a device or an electronic agent. As indicated in FIG. 1, participant 116 is in communication with the conference application server 108 and/or the conference bridge 112 via the network 104. One having skill in the art will appreciate that the conference participant 116 may be in direct communication with the conference application server 108 and/or the conference bridge 112. Participant 116 includes packet-based and circuit-based communication devices including, for example, a cellular phone, a computer, an internet protocol (IP) telephone and a conventional touch tone telephone. As used herein, participant 116 is intended to include one participant or a plurality of participants. One having ordinary skill in the art will appreciate that a conference call preferably includes a plurality of participants 116, for purposes of collaboration.

Participant handset 120 is interconnected to the network 104 and may embody certain aspects of the present disclosure. Participant handset 120 may be of a variety of packet-based and circuit-based communication devices including, for example, a cellular phone, a satellite phone, a computer, an internet protocol (IP) telephone, a digital telephone and a conventional touch tone telephone. One having skill in the art will appreciate that participant handset 120 may be in direct communication with the conference application server 108 and/or the conference bridge 112.

Participant computer 124 is interconnected to the network 104 and may embody aspects of the present disclosure. Participant computer 124 may be, for example, a general purpose computer.

Figure 2:
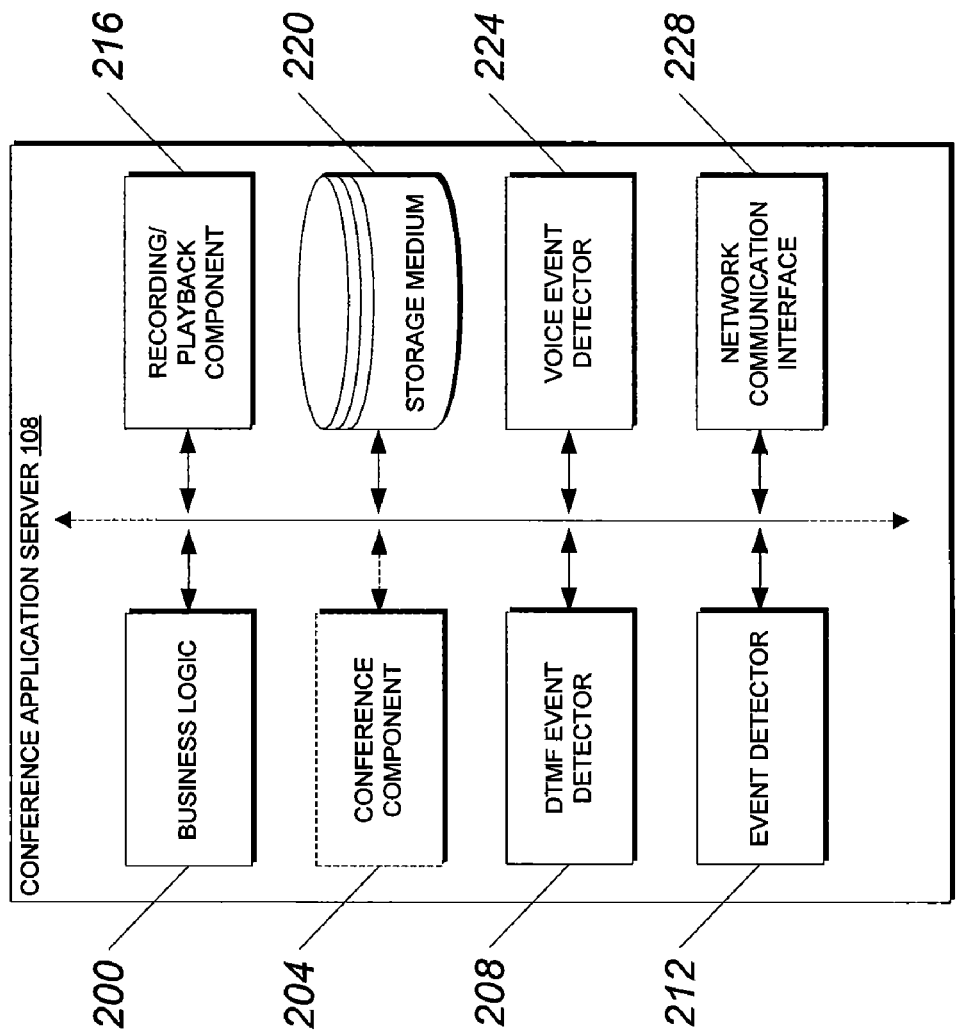
FIG. 2 shows typical elements that may be present in an application server in one embodiment of the present disclosure.

FIG. 2 shows typical elements that may be present in a conference application server 108 in one embodiment of the present disclosure, including a business logic 200, a conference component 204, a dual tone modulation frequency (DTMF) event detector 208, an event detector 212, recording/playback component 216, storage medium 220, voice event detector 224, and a network communication interface 228. Business logic 200 is the processing center of the conference application server 108 that executes machine instructions and performs logical operations. One having skill in the art will appreciate that business logic 200 my be comprised of a device that is capable of executing machine readable instructions including, for example, a microprocessor, an application specific integrated circuit (ASIC), a field programmable gate array (FPGA), a programmable logic controller and any other embedded logic device. Conference component 204 is a component that performs the audio mixing requirements of a conference call. DTMF event detector 208 is a component that detects tone signals. One having skill in the art will appreciate the tones and combinations, and types of signals that may be detected by DTMF event detector 208. Event detector 212 is a component that detects events from a participant including, for example, a click, a presentation transition and a document selection. Event detector 212 is intended to detect any action, document or data that a participant may wish to have associated with a particular temporal point in a conference call. Recording/playback component 216 is a component that performs the encoding and decoding operations that effect the recording and playback of a conference call. Recording/playback component 216 may be a software implemented component that is executed on general processing hardware, or it may be specialized hardware. One having skill in the art will appreciate that recording/playback component 216 may have one or more of recording and playback functionality. One having skill in the art will further appreciate that recording/playback component 216 may have the ability to process, for example, audio, video, data or a combination thereof. Storage medium 220 is an electronic storage area for application data. One having skill in the art will appreciate that storage medium 220 may comprise volatile and/or non-volatile memory. Voice event detector 224 is a component that detects voice signals, and detects commands or cues from a participant's spoken words or utterances. One having skill in the art will appreciate that the voice event detector 224 may comprise automatic speech recognition software and/or hardware components. Network communication interface 228 is the component that provides the physical interface between the conference application server 108 and the network 104, and may include, for example, a network interface card, a radio transmitter, a radio antenna, and an infrared device. One having ordinary skill in the art will appreciate that certain of the foregoing elements of the conference application server 108 may be embodied in the conference bridge 112. It will be further appreciated that the conference application server 108 may be integrated with the conference bridge 112.

Figure 3:
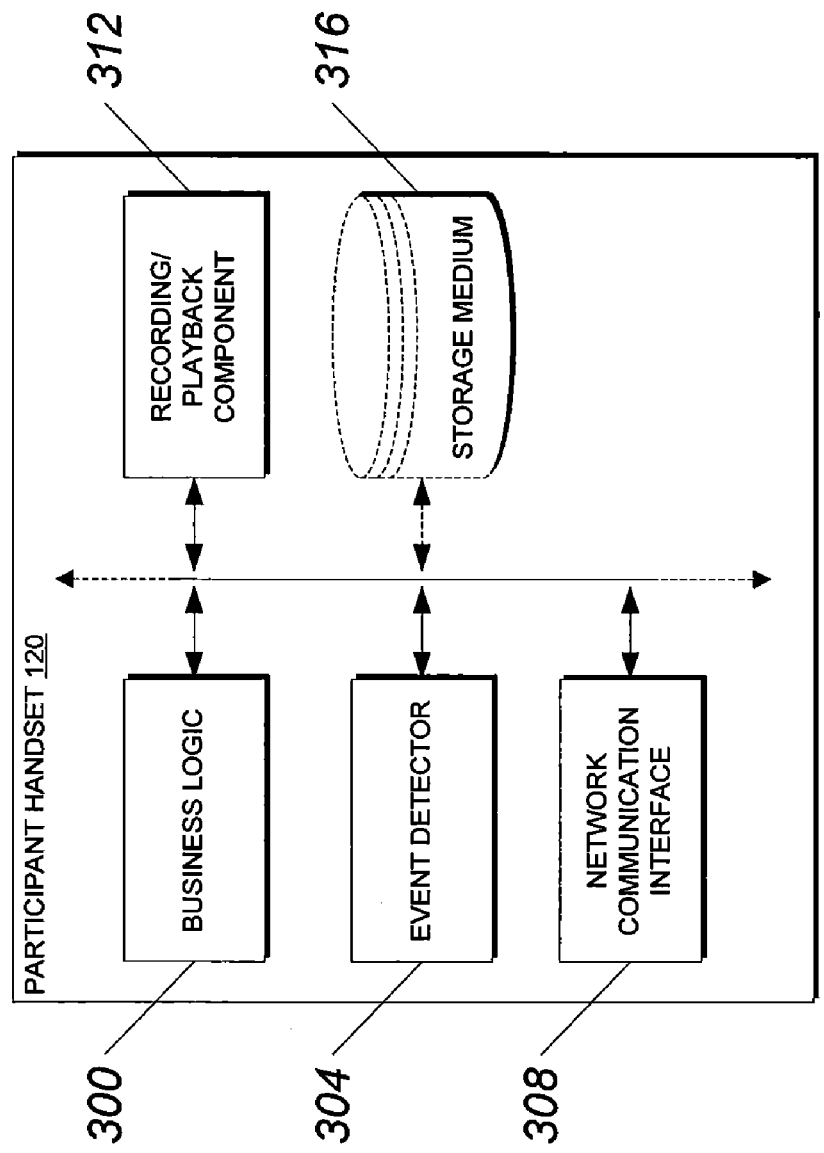
FIG. 3 shows typical elements that may be present in a communication device in one embodiment of the present disclosure.

FIG. 3 shows typical elements that may be present in a participant handset 120 in one embodiment of the present disclosure, including business logic 300, event detector 304, network communication interface 308, recording component 312, storage medium 316 and playback component 320. Business logic 300 is the processing center of the participant handset 120 that executes machine instructions and performs logical operations. Similar to the business logic 200, one having skill in the art will appreciate that business logic 300 may be comprised of a device that is capable of executing machine readable instructions including, for example, a microprocessor, an application specific integrated circuit (ASIC), a field programmable gate array (FPGA), a programmable logic controller and any other embedded logic device. Event detector 304 is a component that detects events on the participant handset 120 including, for example, a click (e.g., button selection), a movement of the participant handset 120 (e.g., by accelerometer), and a document selection. Similar to event detector 212, event detector 304 is intended to detect any action, document or data that a participant may wish to have associated with a particular temporal point in a conference call. Network communication interface 308 is the component that provides the physical interface between the conference application server 108 and the network 104, and may include, for example, a network interface card, a radio transmitter, a radio antenna, and an infrared device. Recording/playback component 312 is a component that performs the encoding and decoding operations that effect the recording and playback of a conference call. Similar to the recording/playback component 216, recording/playback component 216 may be a software implemented component that is executed on general processing hardware, or it may be specialized hardware. One having skill in the art will appreciate that recording/playback component 216 may have one or more of recording and playback functionality. One having skill in the art will further appreciate that recording/playback component 216 may have the ability to process, for example, audio, video, data or a combination thereof. Storage medium 316 is an electronic storage area for application data. One having skill in the art will appreciate that storage medium 220 may comprise volatile and/or non-volatile memory.

Figure 4:
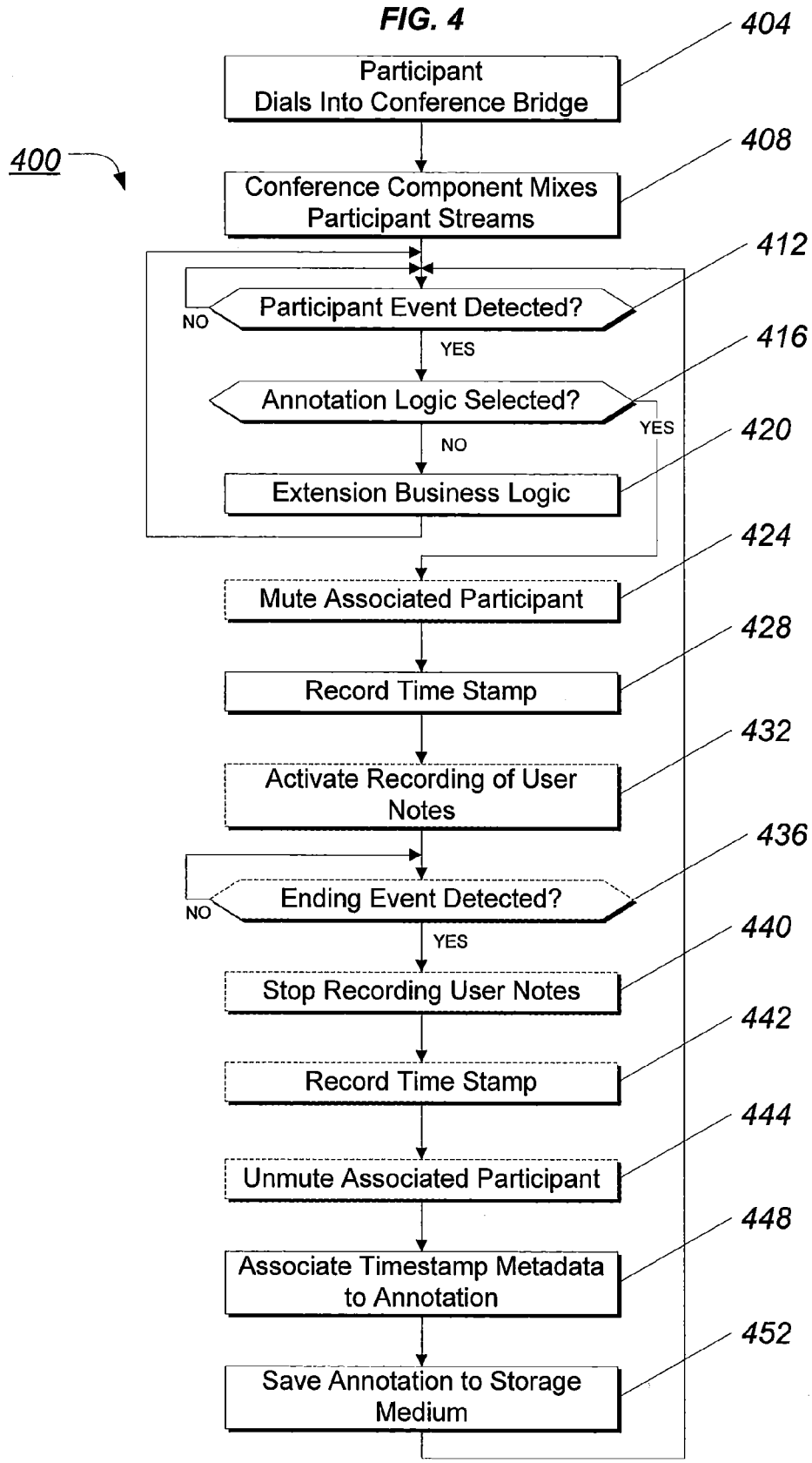
FIG. 4 shows a flow diagram of a process that embodies certain aspects of the present disclosure.

FIG. 4 shows a flow diagram of the process 400 in one embodiment of the present disclosure. A participant 116 becomes a participant in a conference call in step 404 by dialing into a conference bridge 116. One having skill in the art will appreciate that the dialing step 404 may require certain information including, for example, the conference bridge number and the conference code (i.e., PIN or password). The conference component 204 then performs the necessary mixing of the audio streams in step 408 to achieve a desired conference arrangement (e.g., interactive and lecture) thus creating a conference call. A determination is then made at 412 whether a participant event is detected. The participant event may be detected by any of a number of components in the system 100 including, for example, the DTMF event detector 208, the event detector 212, the voice event detector 224, the event detector 304 and the participant computer 124. When a participant event is detected, a determination is then made at 416 whether the event detected in step 412 is one that invokes the annotation logic. If the annotation logic is not selected, then some other business logic may be invoked in step 420 including, for example, mute, participant setup, end call, forward call, transfer call and other telephony or conference functions. When instead, the annotation logic is selected, then in step 424, the participant 116 who invoked the annotation logic is optionally muted. Step 424 is optional because the participant 116 may not need to be muted depending on the annotation that is desired to be recorded. For example, an annotation in its simplest form is a bookmark. One having skill in the art will appreciate that a participant 116 who wishes to simply note a bookmark at a particular time in a conference call does not necessary need to be muted in step 424. Other annotations that may not require muting of a participant 116 include, for example, a slide transition, a typed annotation and an attached document. One having skill in the art will appreciate that the muting step 424 may be performed by a number of components in system 100 including, for example, the conference component 204, the conference bridge 112, the business logic 200, 300, the recording/playback component 216, 312, and the participant computer 124. A time stamp is then recorded in step 428. This time stamp may be an absolute time stamp, or a time stamp that is relative to when the conference call began, or when recording of the conference call began. One having skill in the art will appreciate that one or both time stamps may be recorded in step 428. It will be further appreciated which time stamp is appropriate to associate the time at which the participant event was detected in step 412 to the corresponding temporal point in a conference call.

In association with the muting of the associated participant in step 424, a recording of participant notes may be activated in step 432. The recording function in step 432 may be performed by any of a number of components in the system 100 including, for example, the recording/playback component 216, the recording/playback component 312 and the participant computer 124. A determination is made in step 436 whether another participant event is detected that signifies the end of an annotation. Similar to the event detected in step 412, the participant event may be detected by any of a number of components in the system 100 including, for example, the DTMF event detector 208, the event detector 212, the voice event detector 224, the event detector 304 and the participant computer 124. Step 436 is an optional for the same reasons that step 424 is optional. Additionally, an ending event may not need to be detected in step 436 when the recording step 432 is a preset length of time. For example, selection, in step 416, of a "quick memo" or "short note" may invoke a preprogrammed 5 second recording. As such, an ending event would not need to be detected, and the recording and/or muting would end upon expiration of the preset length of time. In association with detecting an ending event in 436, the recording of user notes is stopped in step 440. This step may be invoked in response to the detection of an ending event in step 436 or upon expiration of a preset time. Step 440 is optional for the same reasons that step 424 is optional. The timestamp is optionally recorded in step 442, and this records the ending timestamp of the annotation. One having skill in the art will appreciate that this ending timestamp is optional because, depending on the type of annotation recorded, this ending timestamp may be calculated from the starting timestamp and the length of the annotation. The participant is unmuted in step 444, which will allow the participant to once again participate in the conference call. In step 448, the time stamp, which was recorded in step 428, is associated to the annotation. The annotation and associated time stamp metadata is saved to a storage medium 220, 316 in step 452. One having skill in the art will appreciate that the recording started in 432 may be streamed to the storage medium 220, 316.

Figure 5:
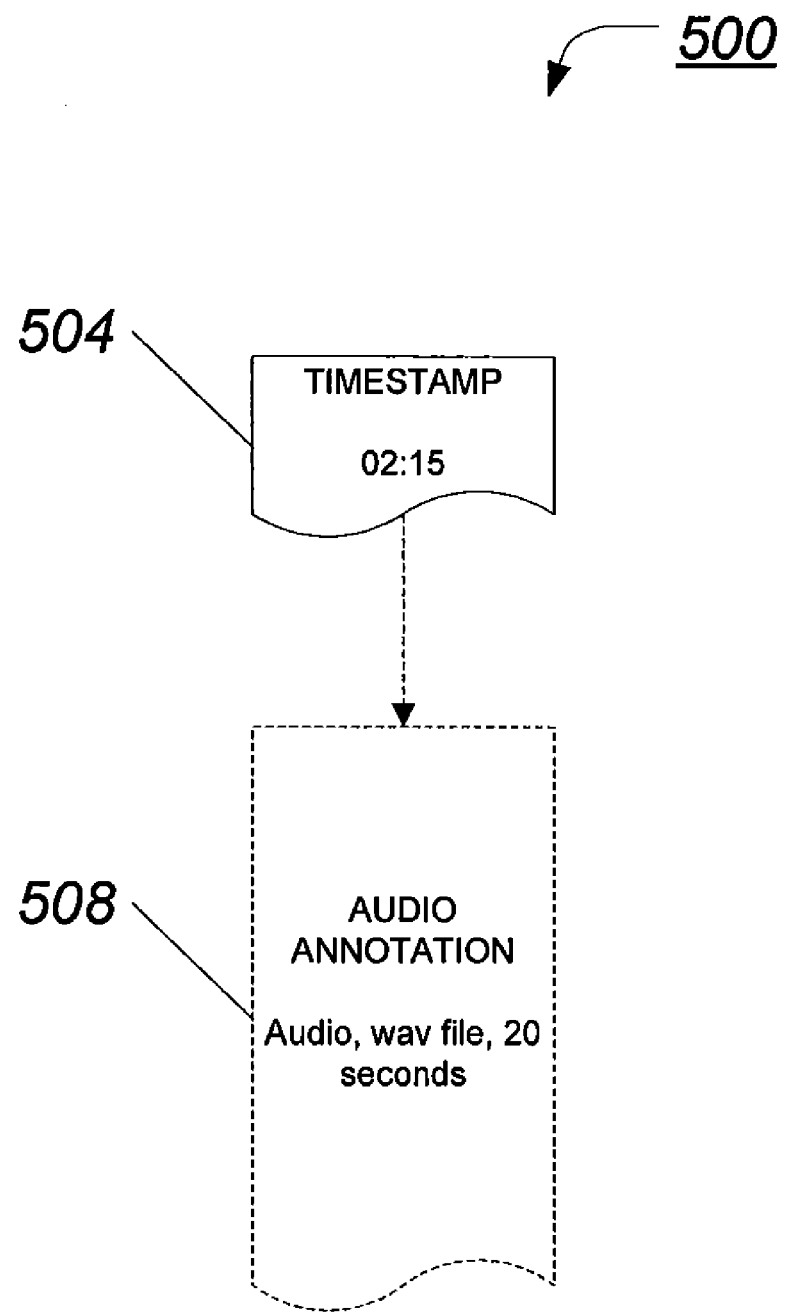
FIG. 5 shows an annotation with its associated timestamp metadata in one embodiment of the present disclosure.

One having skill in the art will further appreciate that the steps identified in FIG. 5 do not necessary have to be executed in the order shown or described, and the steps may be rearranged to achieve similar functionality. It will be further appreciated that certain steps may be performed simultaneously and by different components in the system 100.

FIG. 5 shows an example in one embodiment of the present disclosure of what an annotation 500 may generally be comprised of including, for example, a timestamp metadata 504 with its associated audio annotation 508. The timestamp metadata 504 includes a timestamp of when, in the conference call, the associated annotation is made. FIG. 5 shows an example that indicates the annotation was made two (2) minutes and fifteen (15) seconds into the conference call. It will be appreciated that the timestamp 504 of this example is a relative timestamp. The annotation 508 includes audio data of a spoken annotation stored in wave format having a length of twenty (20) seconds. As noted above and will be appreciated by one having skill in the art, the simplest annotation is a bookmark, which may contain only a timestamp 504. It another aspect of the present disclosure, the timestamp 504 may also include an ending timestamp for the annotation. This ending timestamp may only apply to specific types of annotations 508. It will be appreciated that an ending timestamp may, in some embodiments, be calculated using the starting timestamp and the length of the annotation. In FIG. 5, the ending timestamp may be calculated to be two (2) minutes and thirty-five (35) seconds. It will be further appreciated that the annotation 508 may contain other types of data depending on the annotation being recorded.

The exemplary systems and methods of this invention have been described in relation to telecommunications architectures. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a telephone endpoint, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the methodology is used to annotate recorded media streams from sources other than live voice calls. For example, the methodology may be used to annotate recorded lectures, meetings, and the like.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    recording, by a processor, a media stream, the media stream being part of a live voice call between at least first and second participants;
    during the recording step, receiving, by the processor and from the first participant, an annotation, the annotation being associated with a timestamp, the timestamp being indexed to a particular location in the recorded media stream;
    recording, by the processor, the annotation in association with the timestamp; and
    playing back the annotation associated with the timestamp at the particular location, when the recording is automatically paused.

2. The method of claim 1, wherein the media stream is at least one of audio and video, wherein the annotation is at least one of text, audio, and video, wherein the processor is a part of a conference application server, the conference application server mixing media streams from different participants, and wherein the annotation is a bookmark.

3. The method of claim 1, wherein the annotation is an audio or video annotation and the receiving step comprises:
    receiving, by an input and from the first participant, a selection of an annotation logic; and
    in response, muting, automatically by a processor, at least part of the media stream originating with the first participant.

4. The method of claim 1, wherein the media stream is part of a live call, wherein the recording and receiving steps are performed while the live call is in progress, and wherein the annotation is at least one of a slide transition in a slide presentation and text and wherein the annotation comprises an attached document.

5. The method of claim 1, wherein the recording the annotation in association with the time stamp step comprises:
    terminating the recording function after a preselected time period.

6. A non-transient computer readable medium encoded with processor executable instructions to perform the steps of claim 1.

7. A device, comprising:
    a processor operable to:

record a media stream, the media stream being part of a live voice call between at least first and second participants;

during the recording operation, receive, from the first participant, an annotation, the annotation being associated with a timestamp, the timestamp being indexed to a particular location in the recorded media stream;

record the annotation in association with the timestamp; and playback the annotation associated with the timestamp at the particular location when the recording is automatically paused.

8. The device of claim 7, wherein the media stream is at least one of audio and video, wherein the annotation is at least one of text, audio and video, wherein the processor is a part of a conference application server, the conference application server mixing media streams from different participants, wherein the at least first and second participants comprises a third participant, and wherein the annotation is a bookmark.

9. The device of claim 7, wherein the annotation is an audio or video annotation and the receiving operation comprises:

receive, by an input and from the first participant, a selection of an annotation logic; and in response, mute, automatically, at least part of the media stream originating with the first participant.

10. The device of claim 7, wherein the annotation is at least one of a slide transition in a slide presentation and text and wherein the annotation comprises an attached document.

11. The device of claim 7, wherein the media stream is part of a live call, wherein the recording and receiving steps are performed while the live call is in progress, and wherein recording the annotation in association with the time stamp comprises:

terminate the recording function after a preselected time period.

12. A method, comprising:

providing, by a non-transient computer readable medium, an annotated media stream, the annotated media stream comprising media from a live voice call and a plurality of timestamps indexed to a plurality of locations in the media stream, wherein the plurality of timestamps comprise a selected timestamp, wherein an annotation is associated with the selected timestamp; and performing, by a computer, the following steps:

in response to receiving, by an input and from a first user, a selection of the annotation, providing, to the first user, selectively a portion of the media stream associated with the selected timestamp; and during playback, to the first user, of the annotated media stream, pausing automatically playback of the annotated media stream and providing to the first user, while playback is paused, the selected annotation.

13. The method of claim 12, wherein the annotation is a bookmark.

14. The method of claim 12, wherein the media stream is at least one of audio and video, wherein the live voice call is a conference call, wherein the annotation is at least one of text, audio and video, and wherein the computer is a part of a conference application server, the conference application server mixing media streams from different participants.

15. The method of claim 12, wherein the annotation is at least one of a slide transition in a slide presentation and text and wherein the annotation comprises an attached document.

16. The method of claim 12, wherein the media stream comprises a slide presentation, wherein the annotation marks a transition between slides in the slide presentation, and wherein, during playback, the selected annotation causes the computer to transition, automatically, to a new slide.

17. The method of claim 12, wherein a plurality of annotations correspond to the plurality of timestamps and further comprising:

presenting, by the computer and to the first user, the annotated media stream, wherein the presentation is done by a listing of the plurality of annotations and a respective timestamp of each annotation.

18. A non-transient computer readable medium encoded with processor executable instructions to perform the steps of claim 12.

* * * * *